US010931827B1

(12) United States Patent
 Jayapalan et al.

(10) Patent No.: US 10,931,827 B1
(45) Date of Patent: *Feb. 23, 2021

(54) DATABASE ALLOCATION AND ANALYTICS FOR SERVICE CALL CENTERS

(71) Applicant: United Services Automobile Association ("USAA"), San Antonio, TX (US)

(72) Inventors: Vijay Jayapalan, San Antonio, TX (US); Gregory Yarbrough, San Antonio, TX (US); Eric Smith, Helotes, TX (US)

(73) Assignee: United Services Automobile Association ("USAA"), San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/824,311

(22) Filed: Mar. 19, 2020

Related U.S. Application Data

(63) Continuation of application No. 15/801,094, filed on Nov. 1, 2017, now Pat. No. 10,630,842, which is a continuation of application No. 14/257,688, filed on Apr. 21, 2014, now Pat. No. 9,832,315.

(51) Int. Cl.
 *H04M 3/523* (2006.01)
 *G06Q 10/06* (2012.01)

(52) U.S. Cl.
 CPC ...... *H04M 3/5233* (2013.01); *G06Q 10/0639* (2013.01); *G06Q 10/06398* (2013.01); *H04M 2203/401* (2013.01)

(58) Field of Classification Search
 CPC ......... H04M 3/5233; H04M 2203/401; G06Q 10/06398; G06Q 10/0639
 See application file for complete search history.

(56) References Cited

U.S. PATENT DOCUMENTS

| | | | |
|---|---|---|---|
| 6,587,556 B1 | 7/2003 | Judkins et al. | |
| 7,209,549 B2 | 4/2007 | Reynolds et al. | |
| 7,236,584 B2 | 6/2007 | Torba | |
| 9,686,323 B1* | 6/2017 | Helter | H04L 65/1066 |
| 2005/0175971 A1 | 8/2005 | McIlwaine et al. | |
| 2008/0104133 A1* | 5/2008 | Chellappa | G06F 16/275 |
| 2009/0190745 A1* | 7/2009 | Xie | H04M 3/5232 379/265.11 |
| 2011/0087504 A1 | 4/2011 | Koa | |
| 2012/0027195 A1 | 2/2012 | Shaffer et al. | |
| 2013/0142322 A1* | 6/2013 | Grasso | G06Q 10/06398 379/265.08 |
| 2014/0192970 A1* | 7/2014 | Castellani | G06Q 10/06398 379/265.06 |

* cited by examiner

*Primary Examiner* — Nafiz E Hoque
(74) *Attorney, Agent, or Firm* — Locke Lord LLP; Christopher J. Capelli

(57) ABSTRACT

A method for routing customer service requests to call centers includes collecting data associated with customer service experience between a customer and a call center regarding a completed customer call. The collected data is analyzed to determine a quality of customer service for one or more completed calls between the customer and the call center. A nature of an incoming customer call is determined. The incoming customer call is routed to a call center based upon making reference to the analyzed collected data such that the nature of the customer call matches with corresponding one or more favorable attributes of the call center.

20 Claims, 5 Drawing Sheets

DATABASE ALLOCATION AND ANALYTICS FOR SERVICE CALL CENTERS

This application is a Continuation of U.S. patent application Ser. No. 15/801,094 filed Nov. 1, 2017, which claims priority to U.S. patent application Ser. No. 14/257,688 filed Apr. 21, 2014 which is incorporated herein by reference in its entirety.

FIELD OF THE INVENTION

The present disclosure relates to the field of telecommunications, and more particularly, to routing customer service requests.

BACKGROUND OF THE INVENTION

A typical contact center consists of a number of human agents, with each assigned to a telecommunication device, such as a phone or a computer for conducting real-time or email communication session. The agents typically use these devices to provide sales, customer service, or technical support to the established or prospective customers of a contact center.

Typically, a contact center or its client will advertise to its established or prospective clients, or other third parties a variety of different contact numbers or addresses for a particular service, such as for billing questions or for technical support. The customers or third parties seeking a particular service will then use this contact information, and the incoming caller will be routed at one or more routing points to a human agent at a contact center who can provide the appropriate service. Contact centers that respond to such incoming contacts are typically referred to as "inbound contact centers."

Conventionally, a contact center operation includes a switch system that connects callers to agents. Contact routing in an inbound center, however, is a process that is generally structured to connect callers to agents that have been idle for the longest period of time. More generally, the contact center may set up a queue of incoming callers and preferentially route the longest-waiting callers to the agents that become available over time, without further analysis. Such a pattern of routing contacts to either the first available agent or the longest waiting agent is referred to as "round-robin" contact routing. However, this "round-robin" approach does not always deliver a high-quality customer experience.

SUMMARY OF THE INVENTION

The purpose and advantages of the illustrated embodiments will be set forth in and apparent from the description that follows. Additional advantages of the illustrated embodiments will be realized and attained by the devices, systems and methods particularly pointed out in the written description and claims hereof, as well as from the appended drawings.

In accordance with a purpose of the illustrated embodiments, in one aspect, a method for routing customer service requests to agents is provided. Data associated with customer service experience is collected from one or more data sources. The collected data is analyzed to select a target agent to handle a received customer service request based on one or more attributes. The target agent is selected from a pool of available agents. The received customer service request is routed to the selected target agent.

In another aspect, a method for routing customer service requests to call centers includes collecting data associated with customer service experience between a customer and a call center regarding a completed customer call. The collected data is analyzed to determine a quality of customer service for one or more completed calls between the customer and the call center. A nature of an incoming customer call is determined. The incoming customer call is routed to a call center based upon making reference to the analyzed collected data such that the nature of the customer call matches with corresponding one or more favorable attributes of the call center.

BRIEF DESCRIPTION OF THE DRAWINGS

The accompanying appendices and/or drawings illustrate various non-limiting, examples, inventive aspects in accordance with the present disclosure.

DETAILED DESCRIPTION OF CERTAIN EMBODIMENTS

Figure 1:
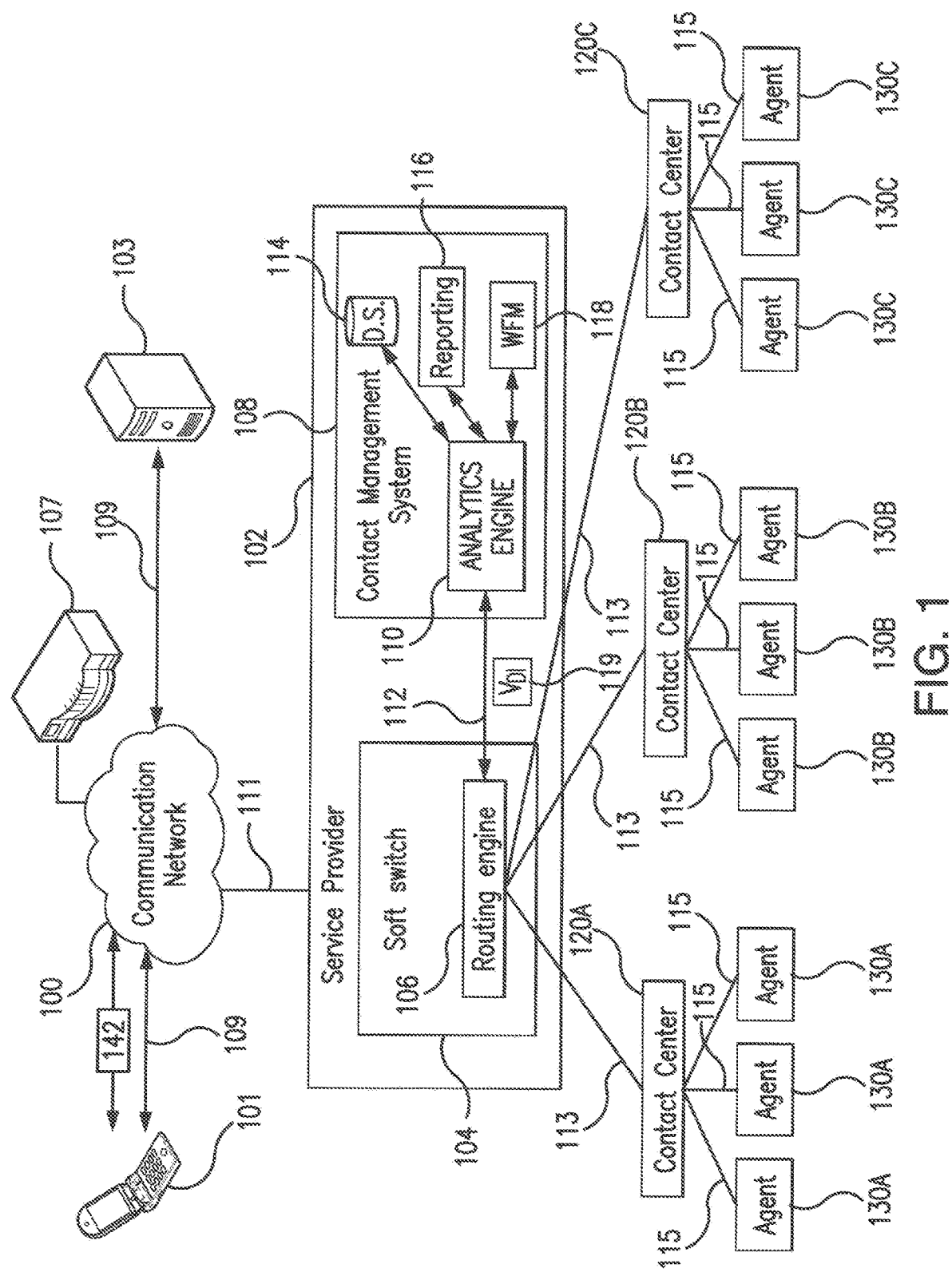
FIG. 1 is a block diagram illustrating a system for managing a plurality of contact centers in accordance with an exemplary embodiment of the present invention.

The illustrated embodiments are now described more fully with reference to the accompanying drawings wherein like reference numerals identify similar structural/functional features. The illustrated embodiments are not limited in any way to what is illustrated as the illustrated embodiments described below are merely exemplary, which can be embodied in various forms, as appreciated by one skilled in the art. Therefore, it is to be understood that any structural and functional details disclosed herein are not to be interpreted as limiting, but merely as a basis for the claims and as a representation for teaching one skilled in the art to variously employ the discussed embodiments. Furthermore, the terms and phrases used herein are not intended to be limiting but rather to provide an understandable description of the illustrated embodiments.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the illustrated embodiments, exemplary methods and materials are now described. All publications mentioned herein are incorporated herein by reference to disclose and describe the methods and/or materials in connection with which the publications are cited.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

It is to be appreciated the illustrated embodiments discussed below are preferably a software algorithm, program or code residing on computer useable medium having control logic for enabling execution on a machine having a computer processor. The machine typically includes memory storage configured to provide output from execution of the computer algorithm or program.

As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described above. One skilled in the art will appreciate further features and advantages of the illustrated embodiments based on the above-described embodiments. Accordingly, the illustrated embodiments are not to be limited by what has been particularly shown and described, except as indicated by the appended claims.

As used herein, the term "customer" refers to individuals such as established customers, prospective customers, or other third parties that interact with contact center agents using a telecommunication device.

As used herein, the term "agent" refers to the individuals acquired by the contact center to interact with customers.

As indicated above, embodiments of the present invention include a method, system, and computer program product that can be used to improve or optimize the routing of customer service requests to agents in a contact center. To increase contact center customer satisfaction, selective routing technique described herein selects an agent best suited to adequately service the customer. This timely and accurate response by the agent is enabled by continuous flow of information to a data analytics engine operatively coupled to the routing engine. Based on the analysis of historical and real time data, the analytics engine selects the agent who can handle objections, answer questions and gather information in an efficient process.

Turning now descriptively to the drawings, in which similar reference characters denote similar elements throughout the several views, FIG. 1 depicts a system for managing a plurality of contact centers in accordance with an exemplary embodiment of the present invention. This system is connected to a plurality of customers over an exemplary communications network 100.

It is to be understood a communication network 100 is a geographically distributed collection of nodes interconnected by communication links and segments for transporting voice and data between end nodes, such as personal computers, work stations, smart phone devices, tablets, televisions, sensors and or other devices such as automobiles, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others.

An exemplary communication network 100 depicted in FIG. 1 illustratively comprises nodes/devices 101-107 (e.g., service provider's telecommunication system 102, client computing devices 103, smart phone devices 101, routers 107, and the like) interconnected by various methods of communication. For instance, the links 109 may be wired links or may comprise a wireless communication medium, where certain nodes are in communication with other nodes, e.g., based on distance, signal strength, current operational status, location, etc. Moreover, each of the devices can communicate voice/video/data packets (or frames) 142 with other devices using predefined network communication protocols as will be appreciated by those skilled in the art, such as various wired protocols and wireless protocols etc., where appropriate. In this context, a protocol consists of a set of rules defining how the nodes interact with each other. Those skilled in the art will understand that any number of nodes, devices, links, etc. may be used in the computer network, and that the view shown herein is for simplicity. In an exemplary embodiment shown in FIG. 1, network 100 includes the Internet and/or a public switched telephone network (PSTN). Other types of networks may be included within the network 100 without departing from the claimed subject matter. Also, while the embodiments are shown herein with reference to a general network cloud, the description herein is not so limited, and may be applied to networks that are hardwired.

FIG. 1 also shows an exemplary service provider's telecommunication system 102 that is communicatively coupled with network 100, via transmission media 111. Also communicatively coupled with the service provider's telecommunication systems 102 via the transmission links 113 is a plurality of contact centers 120A-120C associated with a plurality of agents. At the contact center level, one or more of the telecommunication devices 130A-130C may be used by agents 130A-130C associated with the plurality of contact centers 120A-120C (also referred to as contact center vendors). One or more of the devices 101 and 103 may be used by customers of the service provider to initiate a service-related contact.

A service provider is an entity (e.g., an insurance carrier, such as USAA, or any other entity providing a service and having customers) that seeks to address contact (e.g., customer service request) made by other entities (e.g., customers) with which the service provider has a relationship. To help respond to such contact, an exemplary service provider may use one or more vendors operating one or more contact centers 120A-120C to receive the contact, respond to the contact, and to perform other contact center related services for the benefit of the service provider. In addition to using the contact centers 120A-120C, a service provider may look to yet further entities (e.g., internal agents, representatives, consultants, business partners, etc.) to help address the various contacts referred to above (e.g., service-related contact from the customers).

Communication links 113 may be used to communicatively couple the service provider's telecommunication system 102 with one or more contact centers 120A-120C. Communication links 113 may include any transmission media appropriate for connecting service provider's customers to agents 130A-130C employed by contact centers 120A-120C. In an example embodiment, communication links 113 may include one or more of optical fiber, twisted pairs and wireless media, and the like. Although not illustrated in FIG. 1, communication links 113 may be communicatively coupled with network 100. Other communication media not described may also be used.

Contact made between the various customers devices 101, 103 and the service provider's telecommunication system 102 may include various modes of communications (e.g., electronic communications) that may be digitally encoded, composed of analog signals and/or include a combination of digital and analog communication. Some exemplary types of contact may include communications made via Voice Over Internet Protocol (VOIP), analog telephone, online chat, text messaging, electronic mail (email), video conferencing, screen sharing, web conferencing and file sharing, radio broadcast, etc. It is to be appreciated that exemplary forms of communication are provided herein to illustrate types of contact and not to limit the meaning of contact to certain forms of communication.

Agents and customers may transmit and/or receive communications using the clients' devices 101-103 and agents' telecommunication devices 130A-130C. The agents' telecommunication devices 130A-130C may include interface hardware (not shown) and software to transmit and/or receive communications via the transmission links 111, 113, and 115 to and/or from the network 100 and the contact centers 120A-120C. It is to be noted that the agents' telecommunication devices 130A-130C may represent different types of devices (e.g., personal computers (PCs), mobile devices, telephones or any other telecommunication equipment). For example, an entity associated with the telecommunication device 130A represents an agent associated with a service provider and a different entity associated with the devices 101 and/or 103 represents the service provider's customer. In various exemplary embodiments, on behalf of the service provider, the agent using the telecommunication device 130A-130C may communicate via the service provider's telecommunication system 102 with the customer that is using at least one of the devices 101, 103.

The service provider's telecommunication system 102 may perform various contact management-related tasks (described in more detail below), including, but not limited to, selectively routing the received contacts (i.e., customer service requests) originating at customers' devices 101-103 to one of the available agents 130A-130C. The telecommunication system 102 may be implemented in software, hardware or a combination of both software and hardware. The telecommunication system 102 may comprise a multi-media-gateway softswitch 104 (described in more detail below), which may include routing engine 106 that may execute instructions to perform the various contact related tasks (e.g., call routing, call transferring, etc.). Softswitch 104 may include interface hardware to communicate with the customers' devices 101 and 103 via the transmission media 11 and the communication network 100 and may include another interface to communicate with contact centers 120A-120C via the transmission links 113. It may be noted that the number of contact centers 120A-120C and/or the number of agents 130A-130C within each contact center 120A-120C that communicate with the service provider's telecommunication system 102 may be significantly increased when the number of customers supported by the telecommunication system 102 also increases. The telecommunication system 102 may further comprise a contact management system 108 (described in more detail below) which may include analytics engine 110 that may execute instructions to perform the various data aggregation and analytical tasks related to customer service contact management (e.g., collecting data associated with customer service experience, analyzing the collected data to select a target agent from the pool of available agents 130A-130C, etc.). Analytics engine 110 may access one or more data sources 114 and/or reporting module 166 and Workforce Management (WFM) module 118 to retrieve and analyze data associated with one or more customers and one or more agents 130A-130C. The examples of data that may be employed by analytics engine 110 are described below in conjunction with FIG. 2. For some exemplary embodiments, there may be multiple instances of the same data that may be stored in various data sources 114 as redundant data and for recovery purposes. The telecommunication system 102 may further comprise a virtual desktop infrastructure (VDI) server 119 that may support VDI platform described below in conjunction with FIG. 3.

Figure 2:
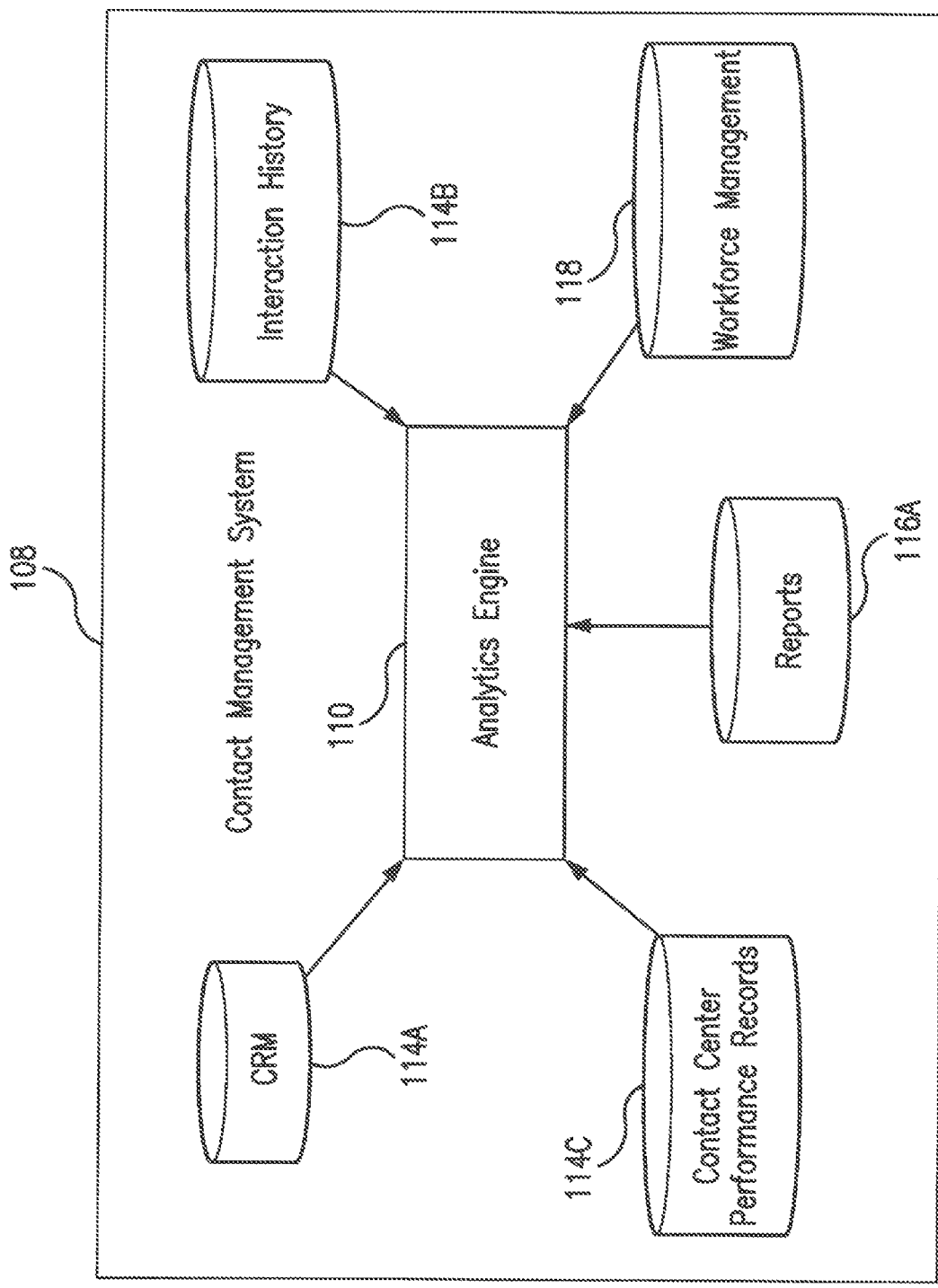
FIG. 2 illustrates an exemplary analytics engine receiving data from a plurality of data sources in accordance with an exemplary embodiment of the present invention.

FIG. 2 illustrates that various embodiments of analytics engine 110 may be integrated with a variety of management systems and data sources to query and correlate information. Some of the data sources include, but are not limited to, customer relationship management (CRM) systems 114A, interaction history records 114B, data related to contact center (and agent) performance 114C, reports data 116A that may be generated by reporting engine 116, workforce management system 118, as shown in FIG. 2.

Typically, a person calling a contact center generally prefers assistance that caters to his/her personality traits (e.g., language skills, educational level, patience, etc.). In other words, a customer seeking assistance is not as likely to be satisfied with the experience or receive the requested information if the member service representative (MSR), such as agents 130A-130C, does not speak the customer's language or if the MSR is unable to explain a resolution to the customer's problem in a way that the customer is able to understand. To address this reality, service providers may log all customer interactions in an effort to identify and repeat well-received customer interaction practices, while simultaneously identifying and discontinuing conduct that has in the past resulted in a less than positive experience for the customer. In this context, logging refers to the process of recording questions, answers and problems that arise during a particular interaction. After aggregating a sufficient amount of data, service providers may identify some trends. That is, by logging all customer interactions service providers may be better prepared to identify specific services that are more likely to be purchased by a particular customer and, what agent behavior is more likely to elicit positive and negative responses from the customer. This logged information may be stored, for example, in the interaction history data source 114B. CRM system 114A may store additional customer related information, such as customer profiles and the like.

Contact center performance records data store 114C may store various agent performance metrics for all agents employed by contact centers 120A-120C. For example, agent performance records 114C may include information related to the quality of service interactions. The quality of these service interactions may be measured by the customer's feedback indicative of the customer's experience during the interaction and the quality of customer issue resolution. Workforce management system 118 may maintain additional agent-related information such as schedules, roles, skill types, experience levels, titles, and the like. Reports data store 116A may store a plurality of reports generated by reporting engine 116. Such reports 116A may include, for example but not limited to, agent efficiency and subject matter expertise reports.

Each of the aforementioned data sources 114A-114C, 116A and 118 can utilize a different data architecture, format, and protocol. In an embodiment of the present invention the contact management system 108 may include an interim datastore in which data from the various sources is collected. In this way, data from the different data sources, each with a different data architecture and format, can be collected in a single common database (not shown in FIG. 2). Analytics engine 110 can access contact management related data by accessing the interim datastore, rather than the actual data sources 114A-114C, 116A and 118. However, in this embodiment, synchronization operations and other safeguards must be performed frequently, to ensure that the data in the interim datastore is a faithful copy of the data in the actual data sources 114A-114C, 116A and 118.

Figure 3:
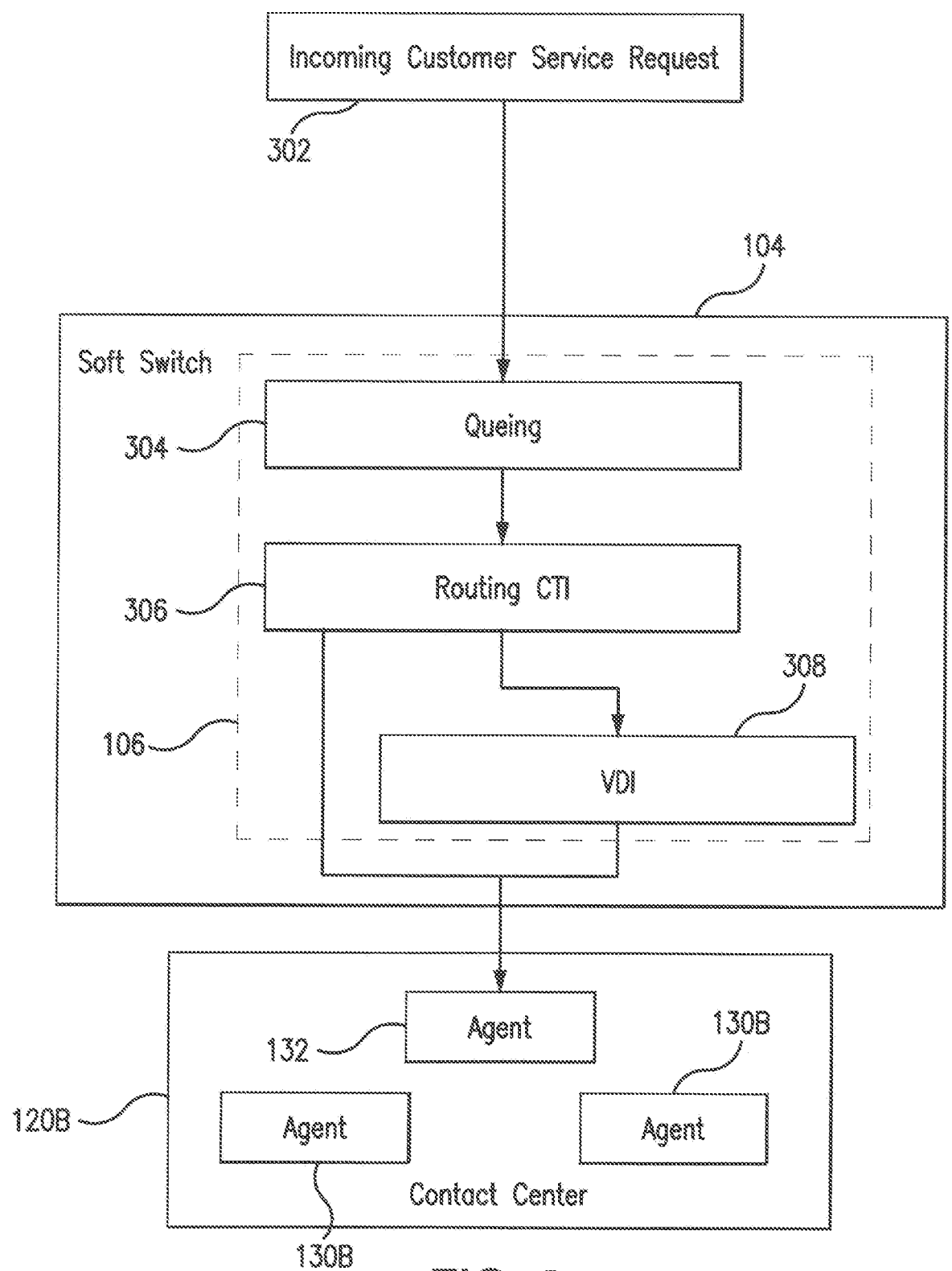
FIG. 3 illustrates an exemplary routing engine operatively interconnected with the analytics engine of FIG. 2 in accordance with an exemplary embodiment of the present invention.

FIG. 3 illustrates an exemplary routing engine 106 operatively interconnected with the analytics engine of FIG. 2 in accordance with an exemplary embodiment of the present invention. As shown in FIG. 3, routing engine 106 may be a key component of the softswitch 104 configured to analyze a plurality of incoming customer requests. As previously mentioned, a plurality of customers may interact with the service provider's telecommunication system 102 over a variety of channels. For example, one customer may send a customer service request in the form of an email message, another may telephone the service provider, a third may prefer to communicate interactively over a computer network via a website or chat room, and still another may prefer to communicate across several mediums simultaneously. Accordingly, in an embodiment of the present invention, softswitch 104 may be a soft switch capable of handling multi-media communications. Multimedia communication involves, accordingly, integrated presentation of text, graphics, video, animation, sound, and the like, using different media and multiple information elements in a single application or session.

According to an embodiment of the present invention, softswitch 104 may be configured and operable to separate the call control functions of a call (or, "session control" functions in the context of a multimedia communication session) from the media gateways (i.e., transport layer(s)) that carry it. Call control features can vary, but call routing, connection control (such as creating and tearing down sessions), and signaling interworking features may be included. These functionalities may collectively be referred to as session control. The softswitch 104 functionality can also include the ability to route an incoming customer service request to a target agent identified by analytics engine 110 based on one or more attributes and the ability to transfer control of the call (or session control) between the associated contact centers 120A-120C. In addition, the softswitch 104 functionality can also include support of data collection functions such as determining a nature of an incoming customer service request 302.

Referring back to FIG. 3, the routing engine 106 may include a queing component 304. The queing component 304 may be capable of acquiring the identification information of the customer originating the incoming request 302. Preferably, the identification information includes at least one of a telephone number of customer, an instant messaging system account of customer, and the like. In one embodiment, queing component 304 may comprise an Interactive Voice Response (IVR) system. Queing component 304 in cooperation with Routing CTI component 306 may be capable of determining the availability of one or more agents 130A-130C in the associated contact centers 120A-120C. If no agent 130A-130C is available when the incoming request 302 arrives queing component 304 may place such request into a corresponding queue. Queing component 304 may perform additional processing to improve routing efficiency described below.

According to an embodiment of the present invention, the routing engine 106 may further include a Computer-Telephony-Integration (CTI)-enabled routing component 306 that may be operatively coupled to analytics engine 110. As described below, analytics engine 110 preferably determines how to route the incoming call (customer service request 302) and may select a target contact center, such as contact center 120B and a target agent, such as agent 132. In response to receiving the information associated with the target agent 132, routing CTI-enabled component 306 preferably facilitates call (session) transfer to that particular agent.

According to another embodiment of the present invention, at least one of the plurality of contact centers 120A-120C (e.g., second contact center 120B) may be configured to utilize a VDI. VDI platform may be operated in a cloud environment (not shown in FIG. 3). VDI platform may facilitate the flow of information (i.e., voice/video/data) between the softswitch 104 and agent's telecommunication device. Advantageously, the VDI platform may increase the productivity of agents 130B, 132 who may work remotely or from mobile enterprise devices such as smartphones, laptops, or tablet computers. Accordingly, as shown in FIG. 3, softswitch 104 may include a VDI interface 308. VDI interface 308 may operate in cooperation with a virtual machine server device (or VDI server 119) shown in FIG. 1. Telecommunication devices 130B utilized by agents 130B may be implemented as thin clients within the VDI platform. In the embodiment shown in FIG. 1, the thin client device may operate to support real time communications between the agents 130B and customers originating the incoming customer service request 302. VDI interface 308 may cooperate with routing CTI component 306 to establish a corresponding session between the customer and the target agent 132. In an embodiment of the present invention, softswitch 104 may transmit, for example, a media stream, such as real-time transport protocol (RTP) media and the control data stream associated with agent's virtualized operations via the established multimedia session. It is noted that if the target contact center, such as contact center 120B, does not utilize the VDI infrastructure, after making its decision on how best to route a particular customer service request 302, routing CTI component 306 may generate and transmit appropriate command messages to target agent's device 132 in order to implement this decision. In an embodiment of the present invention, upon establishing the communication session between the customer and the target agent 132, routing CTI component 306 may generate a corresponding record, for example, in interaction history data source 114B. This newly generated record may store information related to the customer service experience between this particular call center agent 132 and the customer.

Figure 4:
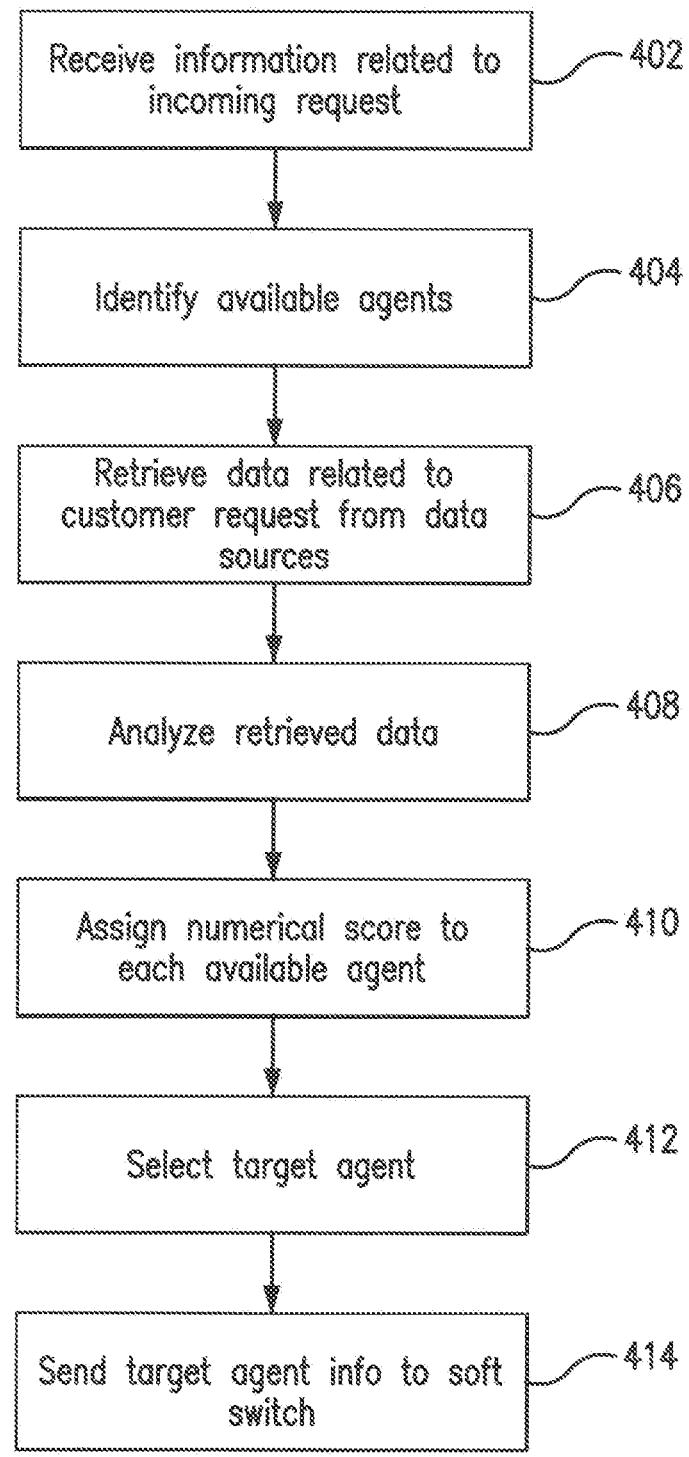
FIG. 4 is a flowchart of operational steps of the analytics engine program of FIG. 2 in accordance with an exemplary embodiment of the present invention.

FIG. 4 is a flowchart of operational steps of the analytics engine program of FIG. 2 in accordance with an exemplary embodiment of the present invention. Before turning to description of FIG. 4, it is noted that the flow diagram shown therein is described, by way of example, with reference to components shown in FIGS. 1-3, although these operational steps may be carried out in any system and are not limited to the scenario shown in the aforementioned figure. Additionally, the flow diagram in FIG. 4 shows examples in which operational steps are carried out in a particular order, as indicated by the lines connecting the blocks, but the various steps shown in these diagrams can be performed in any order, or in any combination or sub-combination. It should be appreciated that in some embodiments some of the steps described below may be combined into a single step. In some embodiments, one or more additional steps may be included.

As previously indicated, to improve customer service, analytics engine 110 may track and analyze certain information related to an incoming call. Accordingly, at 402, analytics engine 110 may receive such information from the queing component 304 of the softswitch 104. The information may include, but is not limited to, a nature of the incoming customer service request 302 (i.e., billing question, new service request, etc.), customer's identification information, time of day, as well as other factors known to those of skill in the art. The determination regarding the nature of the incoming customer request 302 may be made via the IVR system or by searching the text of the customer service request 302, if such request is in a text form (i.e., email, text message, chat message, etc.).

At 404, analytics engine 110 in cooperation with the routing engine 106 may identify one or more available agents from the pool of all agents 130A-130C associated with one or more contact centers 120A-120C. In other words, one of the routing engine's 106 components, for example routing CTI component 306, may identify which agents are logged-in and available. In an embodiment of the present invention, routing engine 106 may send a list of available contact centers 120A-120C along with a list of available agents within each of the contact centers 120A-120C to analytics engine 110.

At 406, analytics engine 110 preferably retrieves data related to the incoming customer service request 302 as well as data related to one or more available contact centers 120A-120C and/or one or more available agents 130A-130C within each of the one or more available contact centers 120A-120C from the plurality of data sources 114A-114C, 116A and 118, as discussed above in conjunction with FIG. 2. For example, analytics engine 110 may retrieve profile of the customer associated with the incoming call (request) 302 from the CRM system 114A. As another non-limiting example, analytics engine 110 may access the interaction history data source 114B to determine whether another request having a similar nature has been previously handled by any of the available contact centers 120A-120C and/or any of the available agents 130A-130C. As yet another example, analytics engine 110 may retrieve all performance records associated with the list of available contact centers 120A-120C and/or any of the available agents 130A-130C from the contact center performance records data source 114C.

At 408, analytics engine 110 may analyze data retrieved at step 410. In an embodiment of the present invention, such analysis may be directed to one or more pre-defined attributes. These attributes may include, but are not limited to, the type of the incoming customer service request 302, a customer profile, a customer location, a subject matter of the incoming customer service request 302, an agent's profile as well as other service-related attributes known to those of skill in the art. As an example, analytics engine 110 may analyze the collected data to determine a quality of customer service for one or more completed calls between the customer associated with the customer service request 302 and one or more of the available contact centers 120A-120C. As another example, the plurality of contact centers 120A-120C may be arranged in accordance with subject matter expertise of agents associated therewith. More specifically, first contact center 120A may handle all requests associated with one or more life insurance products, second contact center 120B may handle all requests associated with homeowner's insurance, while a third contact center 120C may handle exclusively health insurance claims. Accordingly, at 408, analytics engine 110 may identify best suited contact center 120A-120C to adequately service the customer. As yet another non-limiting example, analytics engine 110 may analyze the retrieved performance data to determine which contact center 120A-120C and/or which agent 130A-130C from the pool of available agents may provide best quality of service at certain times of day (e.g., time of day associated with the incoming service request 302). According to various embodiments of the present invention, analytics engine 110 can employ various classification (explicitly or implicitly trained) schemes or systems. For instance, such classification schemes may include, but not limited to, boosting classifiers, transduction classifiers, inductive classifiers, support vector machines, neural networks, expert systems, Bayesian belief networks, fuzzy logic, data fusion engines, and the like.

According to an embodiment of the present invention, the functionality of analytics engine 110 may include scoring a set of available agents based on the aforementioned set of attributes. For instance, analytics engine 110 may rank each of the available agents based on performance for a particular outcome (such as customer satisfaction, revenue generation, customer preferences, cost, combinations thereof, and the like). At 410, analytics engine 110 may assign a corresponding numerical score to each agent 130A-130C included in the pool of available agents based on the analysis conducted at 408. The numerical score may include a normalized score, ranking relative to other available agents 130A-130C, ranking relative to other contact centers 120A-120C, and the like.

At 412, analytics engine 110 may match the received incoming call (request) 302 to one of the available contact centers 120A-120C and/or to one of the available agents 130A-130C, for a desired customer service improvement/optimization. According to an embodiment of the present invention, analytics engine 110 may initially determine the availability of a particular contact center, for example the second contact center 120B to handle the received call. Next, analytics engine 110 may compare scores of all available agents 130B, 132 (generated at 410) to select the target agent for routing the received call. For instance, the target agent 132 may have a higher score relative to other agents 130B in the second contact center 120B due to the fact that the target agent 132 had previously interacted with and received the most favorable feedback from the customer associated with the incoming call 302. In other words, step 412 may involve selecting an agent contingent upon analysis of known historical and real-time information related to the incoming customer call 302 conducted with respect to a plurality of pre-determined service-related attributes such that a nature of the incoming customer call 302 matches with corresponding one or more favorable attributes of the selected agent 132 (shown in FIG. 3).

At 414, analytics engine 110 may transmit information identifying target agent 132, selected at 412, to routing engine 106. In response, routing engine 106 may generate and transmit appropriate command messages to target agent's device 132 in order to implement this request submitted by analytics engine 110. This step of routing the incoming customer service request 302 may be operatively controlled by routing engine 106 and other components of the multi-media softswitch 104 shown in FIG. 3. In an embodiment of the present invention this routing step may further involve connecting the customer's call to the telephone or other telecommunication device of the target agent 132. In another embodiment, this step may involve establishing a chat session between the customer's device 101, 103 from which the request was originated and the telecommunication device 132 associated with the target agent 132.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 5:
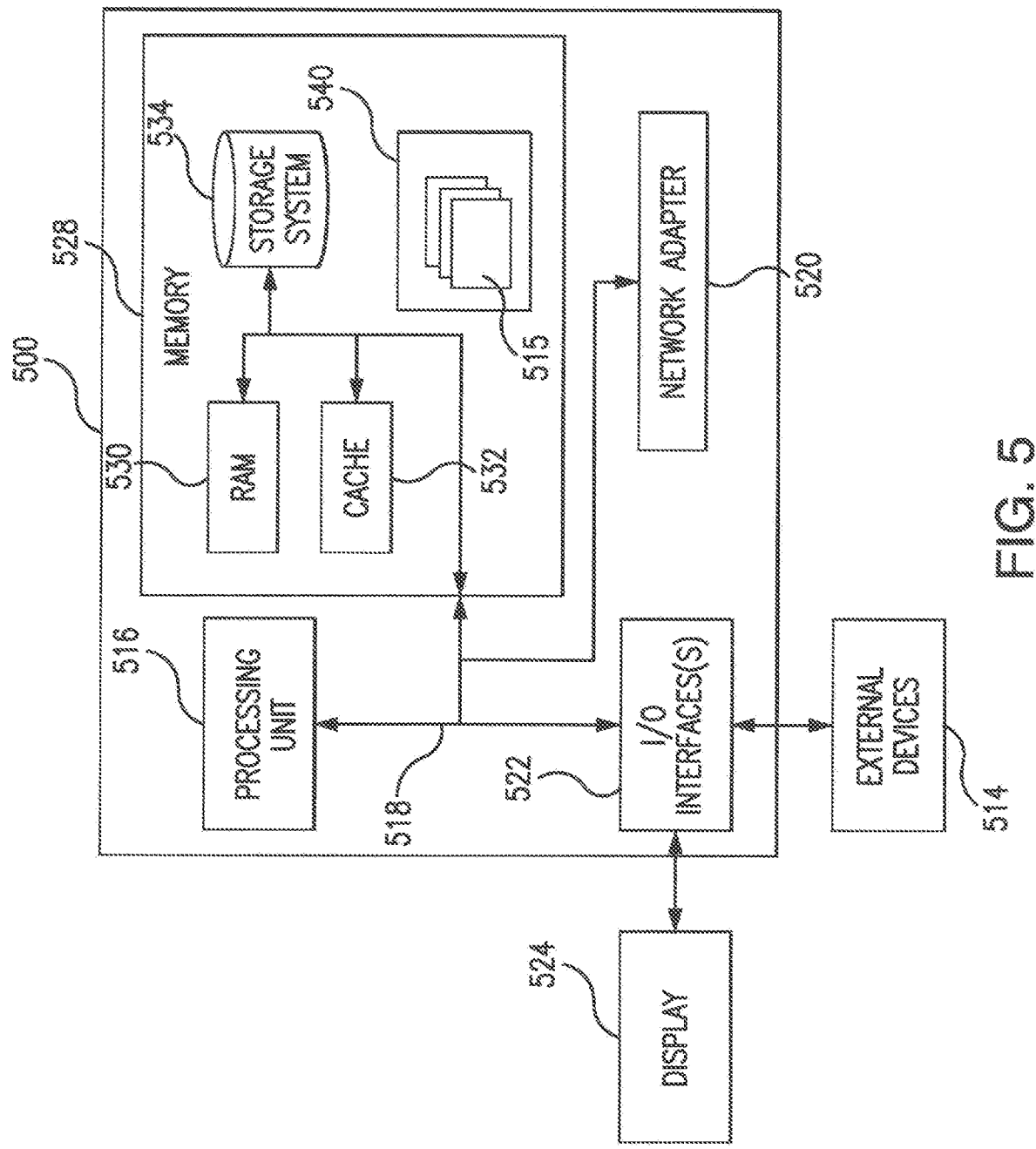
FIG. 5 illustrates a typical computing system that may be employed to implement some or all processing functionality in accordance with an exemplary embodiment of the present invention.

FIG. 5 is a schematic block diagram of an example network computing device 500 (e.g., contact management system 108, softswitch 104, etc.) that may be used (or components thereof) with one or more embodiments described herein, e.g., as one of the nodes shown in the network 100. As explained above, in different embodiments these various devices are configured to communicate with each other in any suitable way, such as, for example, via communication network 100.

Device 500 is intended to represent any type of computer system capable of carrying out the teachings of various embodiments of the present invention. Device 500 is only one example of a suitable system and is not intended to suggest any limitation as to the scope of use or functionality of embodiments of the invention described herein. Regardless, computing device 500 is capable of being implemented and/or performing any of the functionality set forth herein.

Computing device 500 is operational with numerous other general purpose or special purpose computing system environments or configurations. Examples of well-known computing systems, environments, and/or configurations that may be suitable for use with computing device 500 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, and distributed data processing environments that include any of the above systems or devices, and the like.

Computing device 500 may be described in the general context of computer system-executable instructions, such as program modules, being executed by a computer system. Generally, program modules may include routines, programs, objects, components, logic, data structures, and so on that perform particular tasks or implement particular abstract data types. Computing device 500 may be practiced in distributed data processing environments where tasks are performed by remote processing devices that are linked through a communications network. In a distributed data processing environment, program modules may be located in both local and remote computer system storage media including memory storage devices.

Device 500 is shown in FIG. 5 in the form of a general-purpose computing device. The components of device 500 may include, but are not limited to, one or more processors or processing units 516, a system memory 528, and a bus 518 that couples various system components including system memory 528 to processor 516.

Bus 518 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computing device 500 typically includes a variety of computer system readable media. Such media may be any available media that is accessible by device 500, and it includes both volatile and non-volatile media, removable and non-removable media.

System memory 528 can include computer system readable media in the form of volatile memory, such as random access memory (RAM) 530 and/or cache memory 532. Computing device 500 may further include other removable/non-removable, volatile/non-volatile computer system storage media. By way of example only, storage system 534 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 518 by one or more data media interfaces. As will be further depicted and described below, memory 528 may include at least one program product having a set (e.g., at least one) of program modules that are configured to carry out the functions of embodiments of the invention.

Program/utility 540, having a set (at least one) of program modules 515, such as analytics engine 110 and routing engine 106 described above, may be stored in memory 528 by way of example, and not limitation, as well as an operating system, one or more application programs, other program modules, and program data. Each of the operating system, one or more application programs, other program modules, and program data or some combination thereof, may include an implementation of a networking environment. Program modules 515 generally carry out the functions and/or methodologies of embodiments of the invention as described herein.

Device 500 may also communicate with one or more external devices 514 such as a keyboard, a pointing device, a display 524, etc.; one or more devices that enable a user to interact with computing device 500; and/or any devices (e.g., network card, modem, etc.) that enable computing device 500 to communicate with one or more other computing devices. Such communication can occur via Input/Output (I/O) interfaces 522. Still yet, device 500 can communicate with one or more networks such as a local area network (LAN), a general wide area network (WAN), and/or a public network (e.g., the Internet) via network adapter 520. As depicted, network adapter 520 communicates with the other components of computing device 500 via bus 518. It should be understood that although not shown, other hardware and/or software components could be used in conjunction with device 500. Examples, include, but are not limited to: microcode, device drivers, redundant processing units, external disk drive arrays, RAID systems, tape drives, and data archival storage systems, etc.

FIG. 5 is intended to provide a brief, general description of an illustrative and/or suitable exemplary environment in which embodiments of the below described present invention may be implemented. FIG. 5 is exemplary of a suitable environment and is not intended to suggest any limitation as to the structure, scope of use, or functionality of an embodiment of the present invention. A particular environment should not be interpreted as having any dependency or requirement relating to any one or combination of components illustrated in an exemplary operating environment. For example, in certain instances, one or more elements of an environment may be deemed not necessary and omitted. In other instances, one or more other elements may be deemed necessary and added.

With certain illustrated embodiments described above, it is to be appreciated that various non-limiting embodiments described herein may be used separately, combined or selectively combined for specific applications. Further, some of the various features of the above non-limiting embodiments may be used without the corresponding use of other described features. The foregoing description should therefore be considered as merely illustrative of the principles, teachings and exemplary embodiments of this invention, and not in limitation thereof.

It is to be understood that the above-described arrangements are only illustrative of the application of the principles of the illustrated embodiments. Numerous modifications and alternative arrangements may be devised by those skilled in the art without departing from the scope of the illustrated embodiments, and the appended claims are intended to cover such modifications and arrangements.

What is claimed is:

1. A computer system for selectively routing customer service requests to call centers, comprising:
    a contacts management system having:
        data sources comprising customer relationship management records, interaction history, agent performance records, reports, and workforce management records;
        an interim database coupled to each of the data sources for aggregating data from the data sources; and
        an analytics engine module configured to:
            monitor calls between a customer and a call center agent;
            identify call center trends regarding a call center agent once a predetermined call history has been determined with a call center agent by retrieving and analyzing the stored aggregated data from the interim database;

a workforce management system configured to store call agent information including schedules, roles, skill types, experience levels and titles; and a multi-gateway switch having a routing engine module to route an incoming call to a call center agent based upon the determination of the analytics engine module regarding determined trends with the call center agent and information stored in the workforce management system regarding a call center agent.

2. The computer system as recited in claim 1, wherein monitoring calls between a customer and a call center agent includes determining a customer service experience between a customer and a call center agent regarding a completed customer call.

3. The computer system as recited in claim 1, further including a service provider telecommunications system coupled to a plurality of customer call centers.

4. The computer system as recited in claim 3, wherein each customer call center has a plurality of call center agents.

5. The computer system as recited in claim 4, wherein the service provider telecommunications system is configured to receive customer service requests from a plurality of client devices via a communication network.

6. The computer system as recited in claim 1, wherein the customer service request includes a real-time communications session.

7. The computer system as recited in claim 6, wherein the real-time communications session is established in a phone call, a video call or a chat session.

8. The computer system as recited in claim 1, wherein the contacts management system is further configured to determine a numerical score indicative of agent's performance for each agent in a pool of available agents.

9. The computer system as recited in claim 8, wherein the numerical score indicative of agent's performance for each agent in a pool of available agents is determined with regards to the determined nature of the customer's call.

10. The computer system as recited in claim 2, wherein the step of determining a customer service experience includes analyzing an interaction history associated with the customer originating the received customer service request to determine the number of times an agent within a pool of available agents interacted with the customer.

11. A computer system as recited in claim 1 wherein the multi-gateway switch includes a multi-media softswitch coupled to a virtual desktop infrastructure (VDI) server for supporting a VDI platform.

12. A computer method for selectively routing customer service requests to call centers, comprising:

providing data sources comprising customer relationship management records, interaction history, agent performance records, reports, and workforce management records;

aggregating data from the data sources in an interim database coupled to each of the data sources;

monitoring calls between a customer and a call center agent in an analytics module;

identifying call center trends in the analytics module regarding a call center agent once a predetermined call history has been determined with a call center agent by retrieving and analyzing the stored aggregated data from the interim database; and storing call agent information including schedules, roles, skill types, experience levels and titles in a workforce management system; and routing an incoming call to a call center agent in a multi-gateway switch having a routing engine module based upon the determination of the analytics engine module regarding determined trends with the call center agent and information stored in the workforce management system regarding a call center agent.

13. The computer method as recited in claim 11, wherein monitoring calls between a customer and a call center agent includes determining a customer service experience between a customer and a call center agent regarding a completed customer call.

14. The computer method as recited in claim 11, wherein a service provider telecommunications system is coupled to a plurality of customer call centers.

15. The computer method as recited in claim 13, wherein each customer call center has a plurality of call center agents.

16. The computer method as recited in claim 14, wherein the service provider telecommunications system is configured to receive customer service requests from a plurality of client devices via a communication network.

17. The computer method as recited in claim 11, wherein the customer service request includes a real-time communications session.

18. The computer method as recited in claim 16, wherein the real-time communications session is established in a phone call, a video call or a chat session.

19. The computer method as recited in claim 11, wherein the contacts management system is further configured to determine a numerical score indicative of agent's performance for each agent in a pool of available agents.

20. The computer method as recited in claim 18, wherein the numerical score indicative of agent's performance for each agent in a pool of available agents is determined with regards to the determined nature of the customer's call.

* * * * *